Dec. 29, 1970     B. H. PRIEST, JR     3,551,024
FLASHING RETRODIRECTIVE REFLECTOR
Filed Feb. 17, 1969     6 Sheets-Sheet 1

INVENTOR.
BENJAMIN H. PRIEST, JR.
BY Weingarten,
Orenbuch &
Lahive
ATTORNEYS

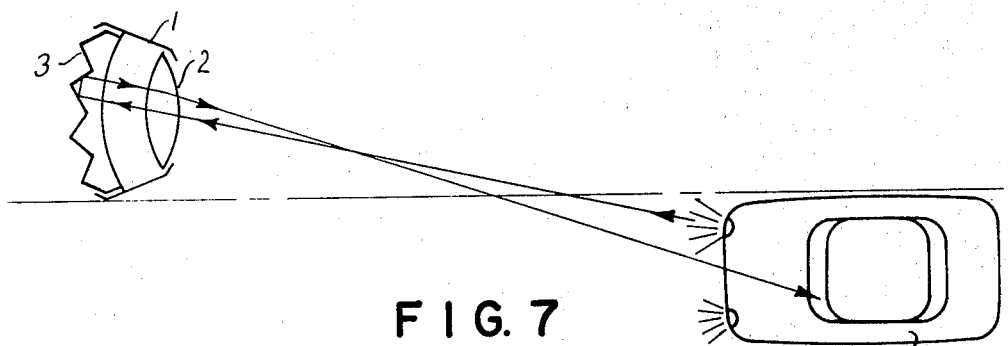
FIG. 7
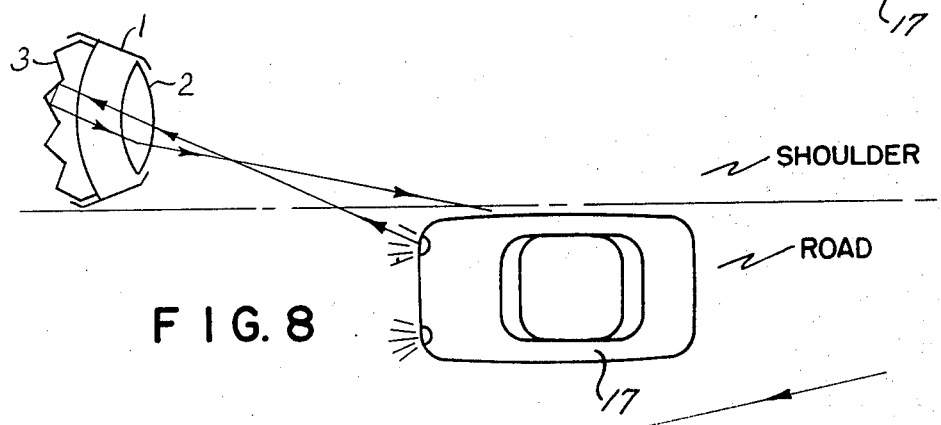
FIG. 8
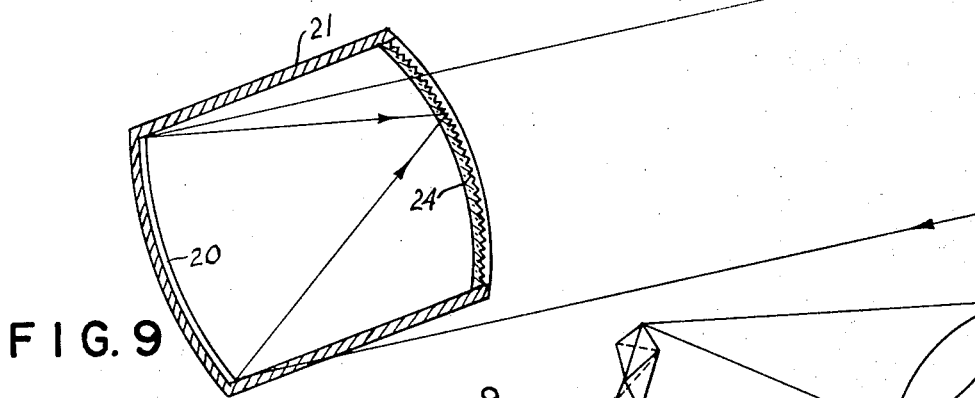
FIG. 9
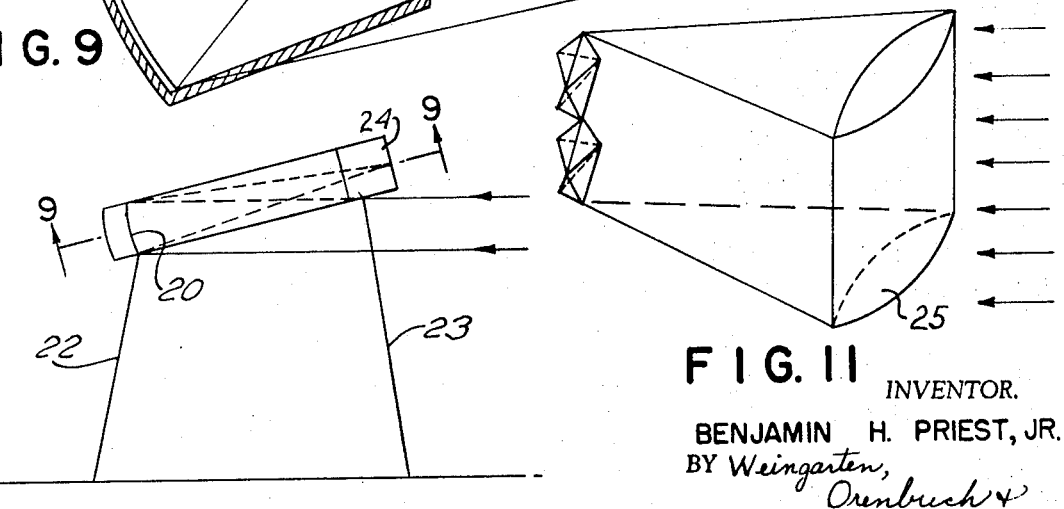
FIG. 10
FIG. 11
INVENTOR.
BENJAMIN H. PRIEST, JR.

Dec. 29, 1970  B. H. PRIEST, JR  3,551,024
FLASHING RETRODIRECTIVE REFLECTOR
Filed Feb. 17, 1969  6 Sheets-Sheet 4

INVENTOR.
BENJAMIN H. PRIEST, JR.
BY Weingarten,
Orenbuch &
Schive
ATTORNEYS

Dec. 29, 1970     B. H. PRIEST, JR     3,551,024
FLASHING RETRODIRECTIVE REFLECTOR
Filed Feb. 17, 1969     6 Sheets-Sheet 5

INVENTOR.
BENJAMIN H. PRIEST, JR
BY Weingarten,
Orenbuch &
Lahive
ATTORNEYS

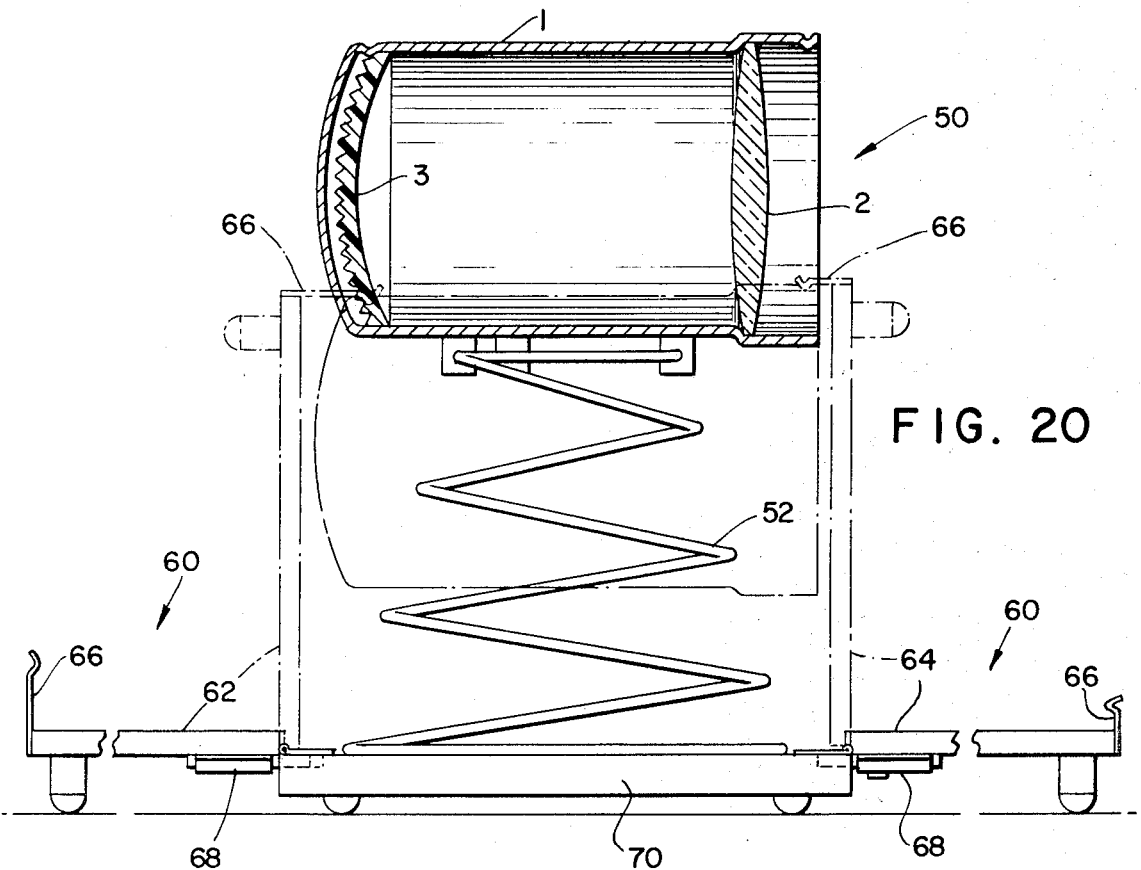
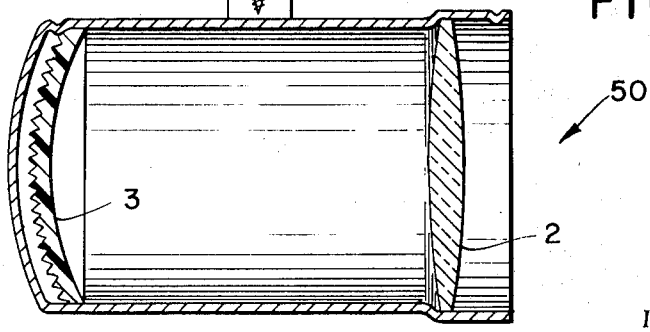

United States Patent Office 3,551,024
Patented Dec. 29, 1970

3,551,024
FLASHING RETRODIRECTIVE REFLECTOR
Benjamin H. Priest, Jr., 1105 Lexington St.,
Waltham, Mass. 02154
Continuation-in-part of applications Ser. No. 505,481,
Oct. 28, 1965, and Ser. No. 603,234, Dec. 20, 1966.
This application Feb. 17, 1969, Ser. No. 813,789
Int. Cl. G02b 5/12
U.S. Cl. 350—99                                 4 Claims

ABSTRACT OF THE DISCLOSURE

A flashing retrodirective reflector has a lens that focuses incident light upon a reflector comprising a matrix of cells having mutually perpendicular facets. As the light's angle of incidence changes with respect to the lens face, the focused light is swept across the matrix cells in the reflector, producing a retrodirective beam that sweeps back and forth. To an observer in the path of the sweeping beam, the retrodirective light appears to flash.

CROSS REFERENCE TO RELATED APPLICATIONS

This application is a continuation-in-part of my applications Ser. No. 505,481 now abandoned and Ser. No. 603,234 which were filed in the United States Patent Office on Oct. 28, 1965 and Dec. 20, 1966 respectively.

BACKGROUND OF THE INVENTION

(A) Field of the invention

This invention relates in general to light reflectors and more particularly concerns devices that reflect incident rays of light back toward their origin.

(B) Prior art

Reflectors that return incident light in the direction of its source are commonly referred to as retrodirective reflectors. Retrodirective reflectors are widely employed in signs and as edge markers upon highways and roads because these reflectors are highly efficient and are made highly visible, at night, by illumination from the headlamps of approaching vehicles. It is a characteristic of the retrodirective reflectors now in widespread use that so long as the incident light which enters the reflector is within a certain angular range, an appreciable amount of light is always reflected back toward the source. When such a retrodirective reflector is illuminated by an approaching vehicle, the incident light from the headlamp of the vehicle is continuously reflected back toward the vehicle until the vehicle reaches a point where the angle at which the incident light impinges upon the reflector is beyond "cut-off" range, that is, beyond the angular range where the reflector is able to direct the light back toward its origin.

For some applications, it is more desirable to employ a retrodirective reflector that appears to flash on and off when illuminated by the headlamps of a vehicle rather than a device that continuously reflects the illumination back toward its source. Flashing or flickering lights, for example, are used upon highways and roads principally as emergency warning measures and have, therefore, become identified as marking hazardous road conditions. The flashing or flickering warning lights now commonly used are active devices and, therefore, must have available a source of energy, such as an electric battery or a supply of kerosene.

The principal objective of this invention, therefore, is to provide a flashing retrodirective reflector which does not require its own source of energy for operation, but, rather, relies for its operation upon incident light from an independent source of illumination.

SUMMARY OF THE INVENTION

The flashing retrodirective reflector of the present invention employs a lens to converge the incident rays of light upon a matrix of reflectors situated in the focal plane of the lens. The reflectors are a cellular structure in which each cell has orthogonal facets, three of which collectively form a cube corner. It is understood that the cube corner cells have facets that are substantially mutually perpendicular. The facets of the cube corner are planar surfaces which cause incident rays to be reflected back from the cell in the direction from which they came. Specifically, the reflected rays are parallel to the incident rays. The arrangement of the facets, however, causes the reflected rays to be offset slightly from the incident rays unless the incident rays are directed to the apex of the cell, or, in other words, are coaxial with the optical axis of the cube corner. The offset reflected rays appear to emanate from a point in the focal plane that is displaced from the focal image of the incident rays. An offset reflected ray, therefore, after passing through the lens, proceeds in a direction that diverges from the direction of the incident ray. When the image from the incident rays moves across a cell, the reflected rays are formed by the lens into a beam which sweeps through a sector. To an observer stationed within the sector, the device appears appears to flash when the reflected beam is directed toward the observer during its sweep.

BRIEF DESCRIPTION OF THE DRAWINGS

The invention, both as to its construction and mode of operation, can be more fully understood from the following exposition, when considered in conjunction with the accompanying drawings, in which:

FIGS. 7 and 8 depict the sweep of the reflected beam due to the motion of an automobile;

FIGS. 9 and 10 depict an embodiment of the invention employing a parabolic mirror;

FIG. 11 illustrates the manner in which a cylindrical lens may be employed in the invention

FIG. 20 illustrates an embodiment of the present invention mounted on a spring; and FIG. 21 illustrates an embodiment of the present invention suspended from an overhead support.

DESCRIPTION OF THE PREFERRED EMBODIMENTS

Figure 1:
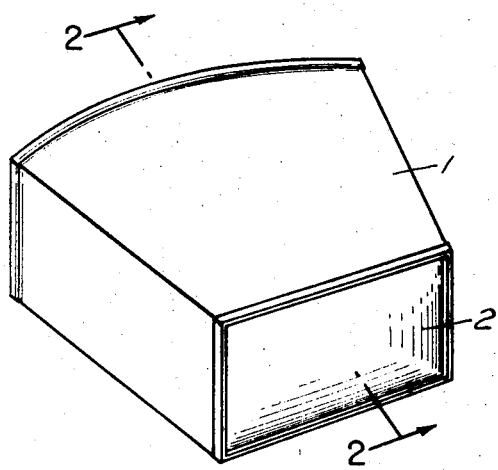
FIG. 1 depicts a preferred embodiment of the invention.

Referring now to FIG. 1, there is shown an embodiment of the invention employing a housing 1 having a lens 2 fixed in an aperture at the front end of the housing. Secured to the housing at its rear end is a light reflecting member 3, shown in FIGS. 2 and 3. The lens 2 causes light entering the front of the housing 1 to be focused upon the light reflecting member 3. The light reflecting member 3 is a generally part spherical segment which is arranged to extend in the focal plane of the lens 2. It is understood that the focal plane as herein used is a curved plane passing through the reflective member a distance equal to the focal length of lens 2.

Figure 4:
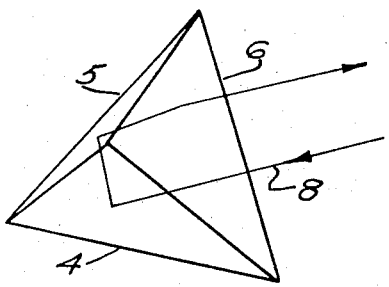
FIG. 4 indicates the manner in which an incident ray is reflected by the orthogonal surfaces of a cell.
Figure 5:
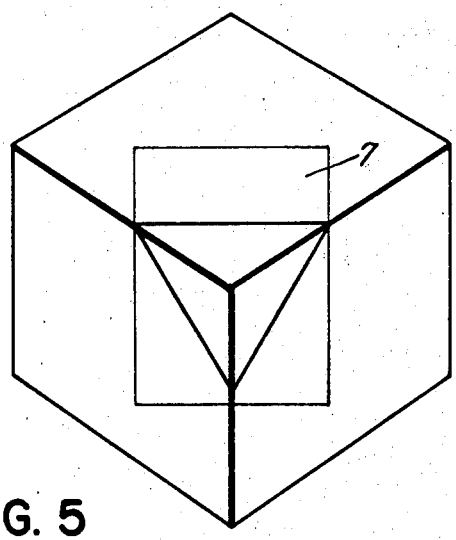
FIG. 5 depicts a cell made by passing a parting plane through the corner of a cube.

The light reflecting member 3 is constituted by a matrix of cells, each cell having three orthogonal planar reflecting surfaces. A typical cell is shown in FIG. 4 as having reflecting planar surfaces 4, 5 and 6. Each planar reflecting surface is perpendicular to the other two planar surfaces. The cell can be more easily visualized by considering the tube shown in FIG. 5. The cell is formed by passing the parting plane 7 through a corner of the cube so as to form the base of a triangular pyramid, each side of the pyramid preferably being an equilateral triangle. Thus, the reflecting cell is termed a cube corner reflector, although it should be understood that the sides of the pyramid may be only substantially mutually perpendicular. Where the cube is a solid and is constructed of a transparent material having an appropriate refractive index, rays of light passing through the base of the pyramid are internally refracted and then reflected between the orthogonal surfaces so as to pass back out through the pyramid's base toward the general direction from which the incident rays proceeded. For maximum reflectivity, the expected axis of the rays of incoming light should be parallel to the optical axes of the individual cells, i.e. a line that extends out from the apex of each cell and is equidistant from the sides of the cell.

In FIG. 4, light ray 8 which is incident upon planar surface 4 is reflected onto planar surface 5. From that plane the ray is reflected onto planar surface 6, where it is then reflected back in the direction from which the incident ray proceeded. The reflected ray, however, is slightly offset from the incident ray and therefore is parallel to but not coincident with the incident ray.

Figure 6A:
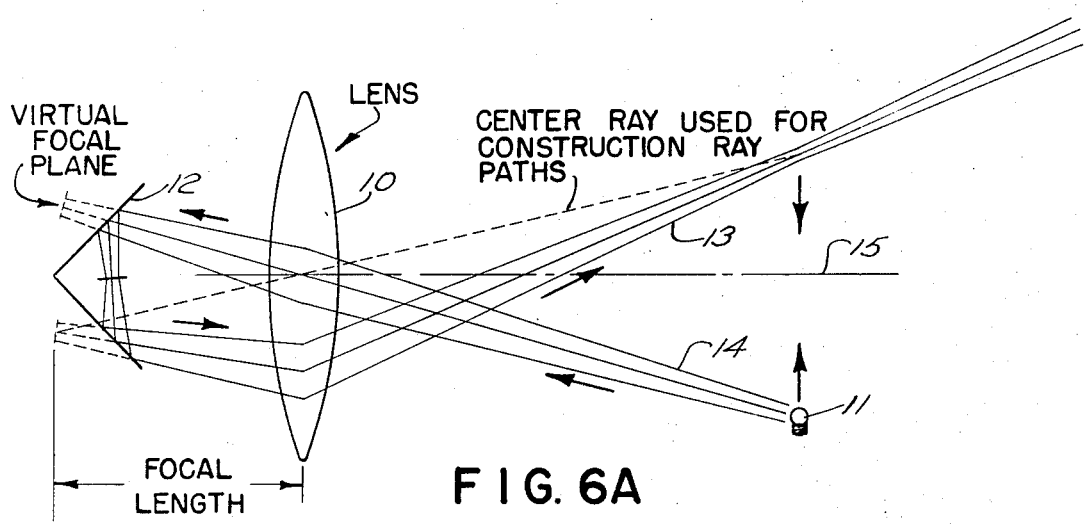
FIGS. 6A, 6B and 6C illustrate the sweeping of the reflected beam due to motion of the light source.
Figure 6B:
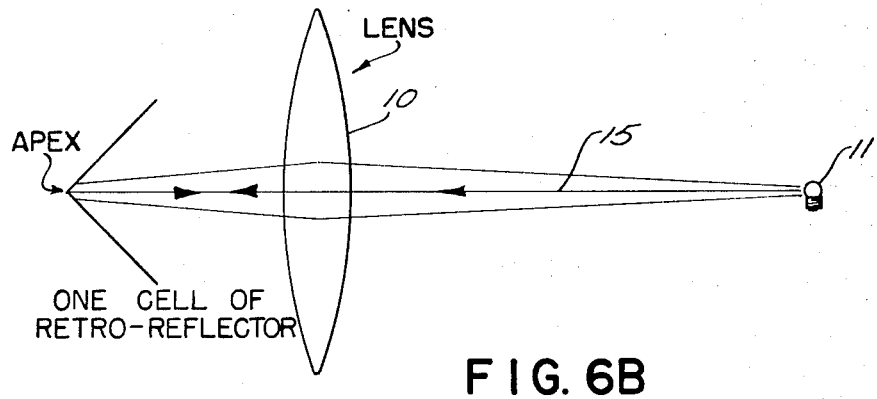
Figure 6C:
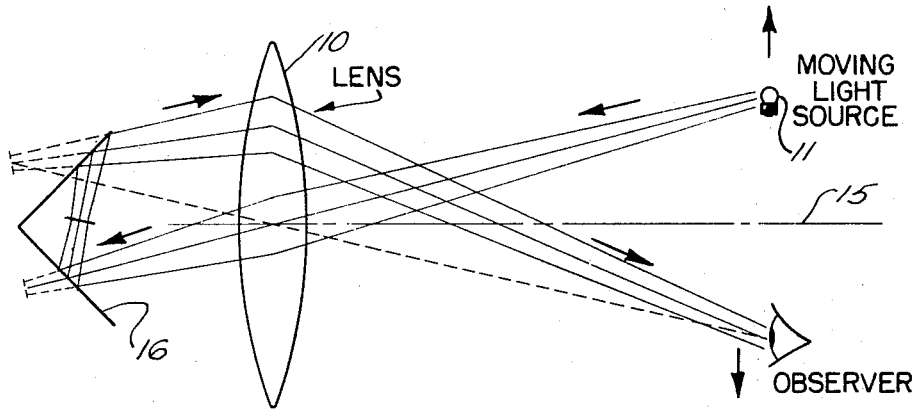

In FIGS. 6A, 6B and 6C a cube corner cell is shown disproportionately large to illustrate the movement of the ray of light. The apex of the cell lies in the focal plane of the lens, and when a source of light 11 is moved angularly with respect to the lens axis, the rays from the light source 11 are formed into a convergent beam by the lens and the beam is swept across the matrix of cells. In FIG. 6A, the light source 11 is displaced from the axis of lens 10 and therefore the light rays 14 are focused in a beam by the lens 10 upon the reflecting surface 12 of the cell, after two internal reflections, the rays are directed by the cell back toward the lens 10 parallel to but offset from the incident rays 14. The reflected rays are refracted by the lens into a beam 13 whose direction diverges from the direction of the rays 14 emanating from the light source. As the light source moves toward the axis 15 of the lens, the beam of reflected light concurrently is moved towards that axis. When light source 11 is at the axis 15 of lens 10, as depicted in FIG. 6B, the incident rays are focused by the lens upon the apex of the cell and the rays are reflected back to the light source. As the light source 11 moves beyond the axis of the lens, the rays passing through the lens become incident upon the reflective surface 16 of the cell and are directed by the cell back toward the lens 10 so that the reflected rays are parallel to but offset slightly from the incident rays. The lens refracts the reflected rays so that they form a beam which diverges from the rays given off by the light source. As the light source continues to move away from the lens axis 15, the reflected beam simultaneously moves away from that axis in the opposite direction.

From FIGS. 6A, 6B and 6C, which are exaggerated to illustrate the mode of operation of the invention, it is evident that as the light source moves upward, the reflected beam is swept downward and that the reflected light is directed back toward its true source only when the light source is on the lens axis.

Turning now to FIGS. 7 and 8, the invention is shown disposed at the edge of a road. An automobile 17, on the road, is indicated as approaching the flashing reflector device. The reflector is greatly exaggerated in size relative to the automobile. The automobile initially is far distant from the reflecting device so that, on a straight road, the rays from the headlamps of the car can be considered to be parallel to the lens axis and therefore are focused by the lens upon the apex of one of the cells. A beam of light, therefore, is reflected back toward the automobile and will initially be visible to the operator of the car because of the divergence of the reflected beam over the long distance. As the automobile approaches, the image of the headlamp directed onto the reflecting member 3 by lens 2 moves across the cells. As the image crosses each cell, the beam is swept across the road and at some time during the sweep is directed at the operator of the automobile. The reflector, therefore will appear to the operator, to flash on and off. Assuming that the automobile is approaching at a constant velocity, the rate at which the flashes occur increases as the automobile nears the device. FIG. 7 illustrates one ray of light emanating from a headlamp being reflected back to the operator of the car. FIG. 8 indicates the position of the reflected ray when the automobile proceeds and approaches the device. The operator cannot see the reflected ray in FIG. 8 because that ray has swept beyond the operator's position within the sweep sector.

Each time the beam is caused, by the angular motion of the automobile headlamps or the reflector, to move across another cell, the operator will see the reflected ray from the reflector only as the beam sweeps through his position. Therefore, the operator has the impression of a blinking light.

Another embodiment of the invention is depicted in FIGS. 9 and 10 which employs a parabolic mirror to focus the incident rays rather than a lens. The parabolic mirror 20 is situated within a housing 21 having legs 22 and 23 which permit the housing to be positioned so that light rays can be incident upon the mirror. A cellular light reflective member 24, similar to the previously described member 3, is secured within the housing 21 so that the rays from the mirror converge upon reflective member 24. Preferably, the apices of the cells are in the focal plane of the mirror.

The underside of housing 21 is preferably open and legs 23 are arranged so as not to obstruct the rays of light from the external source of illumination from impinging upon the mirror. To protect the parabolic mirror and the reflective member 24 from accidental damage, leg 22 is preferably in the form of a hinged lid which can be folded over the opening in the housing when the device is to be stored. Further, legs 23 may be folded to permit ready storage of the device in the trunk of an automobile.

Figure 2:
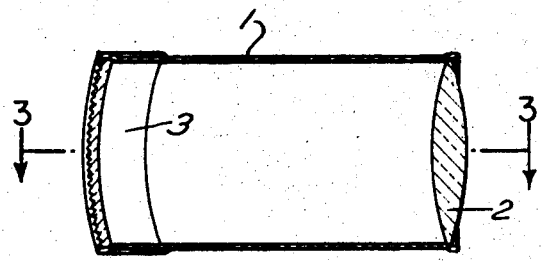
FIG. 2 is a section of the preferred embodiment taken along the plane 2—2 in FIG. 1.
Figure 3:
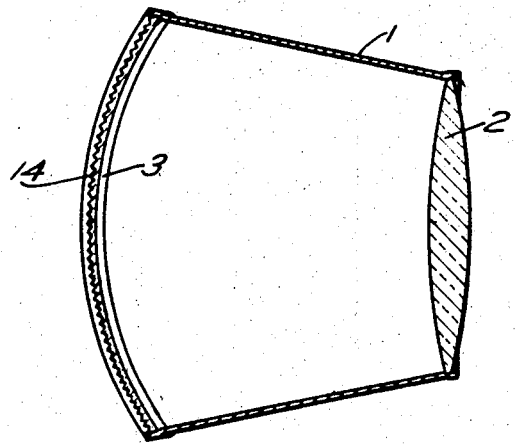
FIG. 3 is a section of the preferred embodiment taken along the plane 3—3 in FIG. 2.

As pointed out above with respect to the embodiment illustrated in FIGS. 1, 2 and 3, the lens 2 causes the incident light to converge upon a single cell except when the focal image moves from one cell to another. Most of the incident light which passes through the lens is reflected back by the cell and is concentrated by the lens into a beam that is directed generally toward the source of illumination. Maximum efficiency of light reflection is obtained when all of the reflection occurs in a single cell.

In a variation of this embodiment, I employ a columnar or "cylindrical" lens as indicated in FIG. 11. Here, the cylindrical lens 25 causes parallel rays of incident light to be focused, not to a point, but rather to a line in the focal plane. The rays of light passing through lens 25 therefore are focused upon a plurality of cells which have their apices in the focal plane and are preferably arranged in a row as shown. It is to be understood, then, that the reflector in the focal plane has rows of cells arranged side by side so that the focal line is swept from one row to another as the automobile approaches the device.

Figure 12:
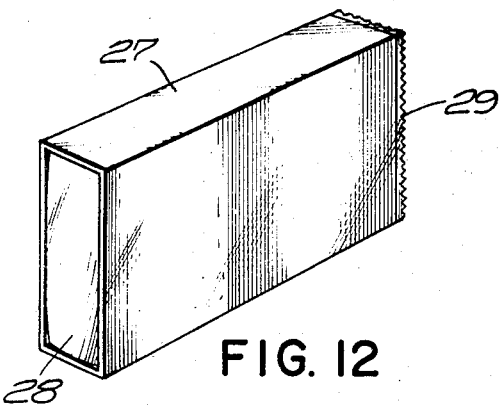
FIGS. 12 and 13 depict an embodiment of the invention employing mirrored sides.
Figure 13:
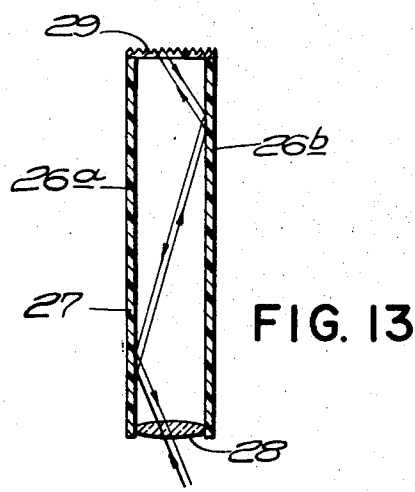

Referring now to FIGS. 12 and 13, there is shown an embodiment of the invention having an open-ended hollow rectangular housing 27 having a lens 28 fixed in the front aperture and a cellular light reflecting member 29 fixed in the rear aperture. The internal surfaces of sidewalls 26a and 26b of the housing 27 are polished or mirrored to provide light reflective planes. The internal reflective surfaces of sidewalls 26a and 26b are preferably parallel to each other and perpendicular to both the longitudinal and transverse axes of the lens 28. It will be noted that thet op and bottom surfaces of the housing 27 of this embodiment play no part in transmitting incident light between the lens 28 and the cellular light reflecting member 29. Accordingly, these surfaces need not have special characteristics. In view of this fact, it is contemplated that a suitable device may be simply constructed by joining a pair of parallel mirrors or internally reflecting walls 26a and 26b together near their rear ends by a cellular light reflecting member 29, and near their front ends by a lens 28 designed to direct incident light upon the light reflecting member 29 at the rear.

Referring now in particular to FIG. 13, a ray of light entering the lens 28 from the left or right at an acute angle is reflected by the internal surfaces of walls 26a and 26b until the reflected ray is incident upon cellular light reflecting member 29. The ray reflected by cellular member 29 travels back, towards the lens 28, along a path parallel to, but offset from the path of the incident ray. Where the light rays are incident upon lens 28 at a less acute angle, the rays passing through the lens may impinge upon only one of the mirrored surfaces of sidewalls 26a and 26b and then be directed onto the cellular light reflecting member 3 without striking the other mirrored surface. Where the angle between the light rays and the axis of the lens is small, for example, when the headlights or other source of light is far from the device, the rays pass directly from the lens 28 onto the cellular light reflecting member 29 without contacting either of the mirrored surfaces of sidewalls 26a, 26b. Because of the different path lengths between lens 28 and cellular light reflecting member 29 which may be traveled by rays passing through lens 28, the lens is preferably constructed to focus the rays exactly at the light reflecting member for some intermediate path length.

For some angles of incidence, the rays will be sharply focused on the cellular reflecting member 29. At other angles of incidence the rays will not be focused exactly on the cellular reflecting member 29 and those rays will, upon reflection, be diffused. When the invention is used as a reflector upon a road or highway, it is generally preferred to construct lens 28 to provide a diffuse reflected light beam when the automobile light source is relatively far away, to provide a relatively sharp reflected light pattern when the light source has approached closer to the device and is, say, a hundred or so feet away, and to provide a diffuse reflected light pattern when the light source further approaches the device. In practice, the reflected light pattern is relatively sharp over a considerable range of distances between the light source and the device so that an intense flashing warning light is presented for an appreciable driving time as the car headlights approach the device. Alternatively, however, the lens 28 may be constructed to have a focal length equal to the length of the housing axis between the lens 2 and the cellular light reflecting member 29, so that a sharp reflected light pattern is produced by a light source initially far distant from the device. This reflected light pattern then remains sharp until the approach of the light source to the device causes the incident rays to be reflected off the mirrored planes 26a, 26b so that their path lengths within the device are increased and a diffuse reflected light pattern is produced.

In either case, once the reflected light pattern has passed from the sharp state to the relatively diffuse state, it may again temporarily assume a sharp state as the light source approaches closer to the device. When the image object (viz the light source) comes close to the lens, the "focal plane" of the image produced by the lens 2 is displaced backwards behind the original focal plane, increasing the path length which incident light rays must then travel within the device to produce a focused image on the cellular reflecting member 3. When this backward displacement of the focal plane beyond the focal length is exactly equal to the extra path length traveled by incident rays is rebounding off the mirrored surfaces of the device, the two factors offset one another and a sharp reflected light pattern is once again produced.

The mirrored surface embodiment of FIG. 13 permits light entering the lens 28 at a high incident angle to reach the cellular light reflecting member 29 despite the narrow width of the housing, thereby resulting in a reduction in the bulk of the device. The slimness of the embodiment makes it convenient for use in the glove compartment of an automobile, while its substantially rectangular configuration makes it easily adaptable for insertion into apertures in auto bumpers, or for insertion into recesses in an automobile body.

Figure 14:
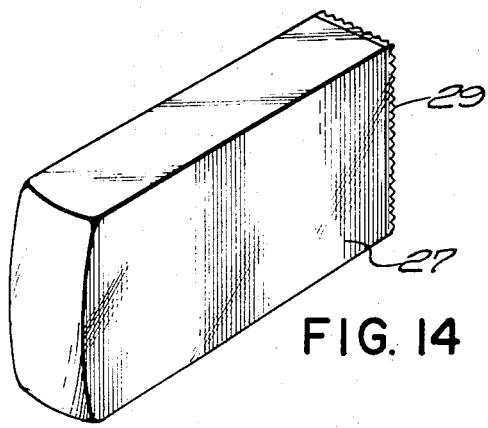
FIGS. 14 and 15 depict an embodiment of the invention employing a solid plastic block.
Figure 15:
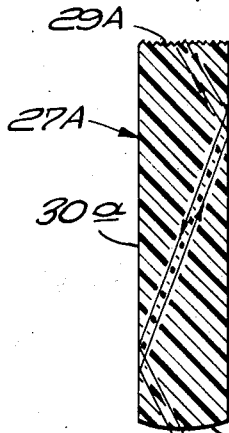

A modification of the FIG. 13 embodiment is shown in FIGS. 14 and 15 where the entire device is a solid of a synthetic material, such as a "plastic."

In the embodiment of FIGS. 14 and 15, a single solid, substantially rectangular block 27 of a transparent material has been molded to provide a lens surface 28A, similar in function to lens 28, and a cellular reflective surface 29A, similar in function to cellular light reflecting member 29. The flat, opposed surfaces 30a, 30b of the block 27A act as mirrors to provide internal reflection and are therefore similar in function to mirrored surfaces 26a, 26b.

The operation of the solid embodiment is substantially similar to the operation of the mirrored surface embodiment, and while the dimensions of both embodiments may be similar, the solid rectangular block may, for example, be constructed of a synthetic material such as Lucite (trademark of E. I. du Pont de Nemours & Co. for their polymethyl methacrylate).

Figure 16:
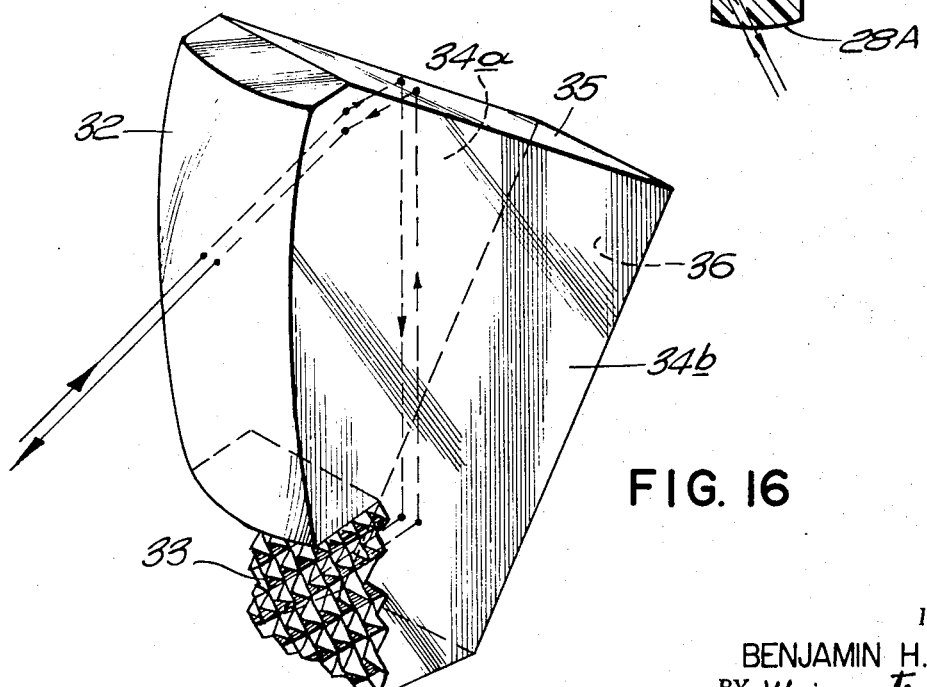
FIG. 16 depicts a compact embodiment of the invention permitting reflection of an incident ray off several housing surfaces.

In the mirrored surface embodiment of FIGS. 12 and 13 and the solid embodiment of FIGS. 14 and 15, the width of the device has effectively been decreased by providing means for reflecting the incident rays from the walls of the device. FIG. 16 depicts an embodiment in which the length of the device is also decreased. While the compact embodiment of FIG. 16 may be constructed as a hollow device having internal mirrored surfaces or as a solid having internal reflecting surfaces, it is described herein only in its solid form. As depicted in FIG. 16, a unitary solid plastic block 31 has been fashioned to provide a lens surface 32 (similar to lens surface 28A) and a cellular reflective surface 33 (similar to cellular reflective surface 29A). Lateral surfaces 34a and 34b, as well as top surface 35 and rear surface 36, are flat internally-reflecting surfaces arranged to direct incident rays passing through lens surface 32 on an angular path to cellular reflective surface 33 and back along a parallel but non-coincident path.

To illustrate the operating principles of the solid embodiment, it is assumed that a ray incident to and passing through lens surface 32 is reflected off the left surface 34a, upwardly and rightwardly to about the center of top surfaces 35. Top surface 35 in turn reflects the ray downwardly towards the bottom of rear surface 36, which in turn reflects the incident ray forwardly towards approximately the center of the reflective surface 33. The ray returns from the cellular reflective surface 33 along an exit path parallel to the entrance path, contacting the rear surface 36, top surface 35, and left surface 34a, and emerging from the lens surface 32 parallel to the entering ray. The entering and departing rays are substantially parallel.

Figure 17:
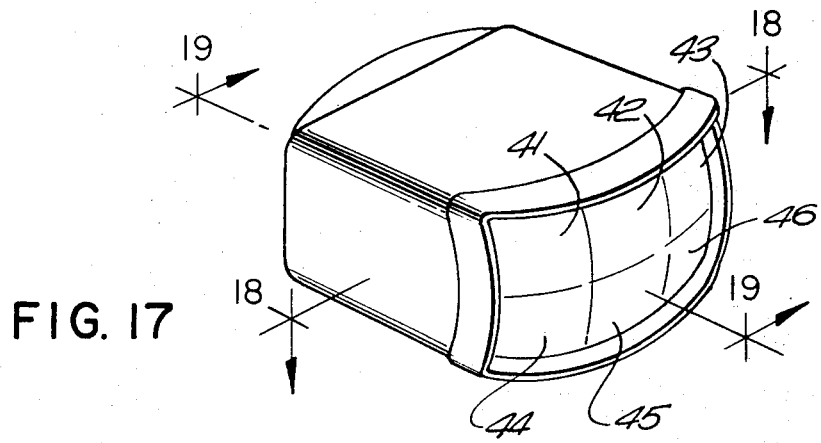
FIG. 17 is a perspective view of an embodiment of the invention employing a hollow housing and an array of lenses.
Figure 18:
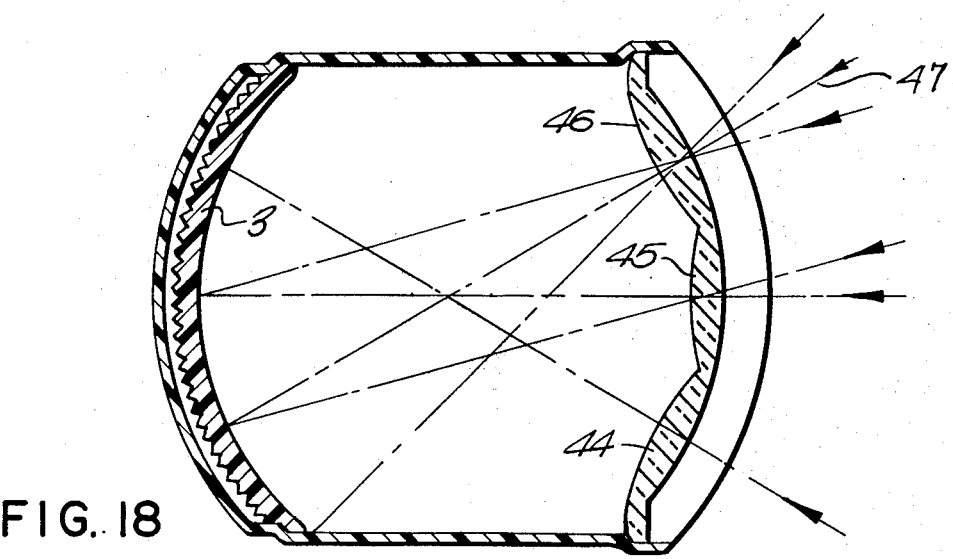
FIG. 18 is a section of the invention taken along plane 18—18 in FIG. 17.
Figure 19:
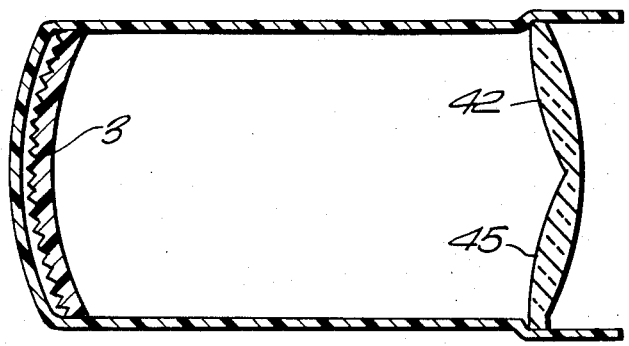
FIG. 19 is a section of the invention taken along plane 19—19 in FIG. 17.

The embodiment of the invention depicted in FIGS. 17, 18 and 19 is similar to the FIG. 1 embodiment, except for the construction of the lens. In the FIG. 17 embodiment, the lens actually consists of an array of lenses 41, 42, 43, 44, 45, 46, which are hereinafter referred to as sublenses. For purposes of exposition, an array of six sublenses has arbitrarily been chosen which is arranged in two rows having three sublenses each. When the incident light is on or near the optical axis of a sublens, as for example the light ray 47 in FIG. 18 which is on the optical axis of sublens 46, the light is focused upon the light reflecting member 3 which is at the focal plane of the sublens and the flashing action takes place as in the FIG. 1 embodiment. Where the angle which the incident light makes with the optical axis of a sublens increases greatly, the optical aberrations of the off-axis rays prevent the formation of a clear image at the focal plane and the brightness of the retroflected beam is materially impaired and there may be no flashing effect from the sublens. However, the angle of incidence which the light rays form with the adjacent sublens may then be within the range of angles for proper focusing upon the light reflecting member so that a retrodirected beam is formed and a flashing effect occurs. Preferably, each sublens is formed to focus rays upon the light reflecting member 3 when the angle of incidence is within ±15° of the optical axis. Where the sublenses are so formed, the sublenses are set in the lens array to have the optical axes of adjacent sublenses at an angle of 30°. When so arranged, three sublenses aligned in the horizontal direction, as in FIG. 18, give a flashing action through a 90° range of angles of incidence. For an arrangement of two sublenses aligned in the vertical direction, as in FIG. 19, flashing action is obtained through a 60° range of angles of incidence. Because of the optical aberrations which result from the light rays passing through adjacent sublenses, a continuous background of reflected light is produced which is less intense than the flashing light beam. Thus, the embodiment of FIG. 17 gives off some light at all times, if the source of light is within the operational range of the device.

In FIG. 20 an embodiment of the present invention is shown wherein the lens and matrix of cube corners are operatively mounted to act as an improved roadway reflector 50. Specifically, housing 1 is carried on the upper end of a coil spring 52. Spring 52 is mounted on the ground at a point adjacent a roadway so as to be struck by rays of light emanating from automobile headlamps. Typically, the embodiment of FIG. 20 is placed near an area where some danger to motorists exists. A flashing light is produced by a moving vehicle acting against the relatively fixed reflector and, as previously described, warns motorists of a danger. Thus, the reflector is similar to that shown in FIG. 1.

The embodiment of FIG. 20 provides a stabilizing means 60 which takes the form of fold-down doors 62 and 64. Latch 66 holds the doors 62 and 64 in the closed position wherein spring 52 is compressed and the lens and matrix of cube corners are protected. This provides a smaller package adapting the device for easy storage. When doors 62 and 64 are opened, slide latch 68 keeps doors coplanar with base 70, thereby forming an outrigger type arrangement for stabilization. This effectively increased base area effects a stabilizing against instability due to wind gusts or the inclined disposition of the device on its support medium.

The embodiment of FIG. 20 differs further from the embodiment shown in FIG. 1 in that the reflector 50 oscillates when spring mounted. Atmospheric wind of a very small magnitude, for example, under five miles per hour, will cause housing 1 to swing back and forth on the spring 52. Passing vehicles can also produce sufficient air movement to cause the body 1 to move back and forth even without an atmospheric wind factor. Any change in angle of the incident light ray with respect to the reflector face, whether caused by an angularly changing light source or a reflector face having an angular change with respect to the source, will accentuate the flashing. For example, a ½ cycle per second spring suspension will continuously oscillate at 2 degrees for 3 to 4 minutes in response to a single light wind gust. Therefore, with respect to the embodiment of FIG. 20, a vehicle approaching the reflector face in a line which intersects the flashing reflector will experience a flashing light. The embodiment of FIG. 1 will not flash when the path of the vehicle intersects the reflector because the light incident upon the lens will not sweep across the lens and the focused light will therefore not sweep across the matrix. In contradistinction, this improvement broadens the operative environment of the reflector in that the reflector need not be placed adjacent a roadway in such a manner that guarantees a change in angle of light incident to the lens to cause flashing.

It should be noted that the actual wind direction is immaterial because the coil spring has four modes or degrees of freedom for vibration, namely, vertically on the spring axis, rotationally on the spring axis, fore and aft, and side to side with respect to the reflector face. It is characteristic of coil spring energy that if the different modes have natural frequencies that are equal or close together, the vibrational energy will flow back and forth between modes. Therefore, no matter what mode is activated by wind or air currents, sufficient flashing results.

FIG. 21 illustrates another mounted embodiment of the present invention. Here, the reflector 50 is shown hanging from an overhead support by means of double eye bolts 51 and 53. FIG. 21 thus shows a pendulum-type suspension which is also responsive to wind gusts, but the oscillations diminish more rapidly than the FIG. 20 embodiment due to friction in the eye bolt pivot. This embodiment, however, permits an inexpensive installation while maintaining a reflector's capability of moving with respect to a light source with no need existing for a separate energy supply.

By way of example only, and not as a limitation on the construction of the invention, typical dimensions of the embodiment of the invention depicted in FIGS. 20 and 21 are a length of 3¾ inches measured along plane 2—2 of FIG. 1, a width of 3 inches at the reflector end of the housing, and a uniform depth of 2 inches. Accordingly, these embodiments are more compact than the commonly used flashing or flickering warning lights requiring a local source of energy.

An objective of the invention is to provide a study, inexpensive flashing retrodirective device of small size so that the device may be stored in the trunk of a car or even in the glove compartment where it is most readily accessible to the driver. Accordingly, there is shown in FIGS. 12 and 13 an embodiment of the invention which is more compact than that shown in FIG. 1, and yet does not reduce the maximum effective operating angle of the device. The "maximum effective operating angle" is the maximum angle between the axis of the lens and a ray of light incident upon the lens 2 which results in a retrodirected ray substantially undiminished in intensity. Having reference now to FIGS. 1 and 3, when the maximum effective operating angle is exceeded, the rays of light which pass through the lens 2 are incident upon the nonreflective walls of the housing rather than upon the light reflecting member 3. Moreover, because of the angle of incidence, some of the light which exceeds the maximum effective operating angle is reflected from the surface of the lens. It will be noted that this effective operating angle limitation applies also to the embodiments of FIGS. 9, 10 and 11 which use a parabolic mirror or a cylindrical lens.

As the invention can be embodied in a multitude of differing structures, it is not intended that the scope of the invention be restricted to the precise embodiment illustrated in the drawings. Rather, it is intended that the scope of the invention be delimited by the appended claims and to include such structures as do not in essence fairly depart from the invention there defined.

I claim:

1. A unitary light-reflective device comprising:
   (A) a housing;
   (B) a single light converging means located at one end of said housing; and
   (C) an array of a large number of cube corner retro-reflective cells at the opposite end of said housing from said light converging means, said cells lying in the curved focal plane of and cooperating with said light converging means whereby incident light throughout a large range of incident angles will be focused by said means onto said cells, said cells being very small to provide a very rapid flashing rate to an observer.

2. The light reflective device as described in claim 1 wherein the light converging means is an array of sub-lenses having their optical axes oriented in different directions, said lenses being arranged to enable the focused light rays at at least two sub-lenses to sweep overlapping areas of the array of cells.

3. A light reflective device according to claim 1 wherein said housing includes a spring for supporting it.

4. A light reflective device according to claim 1 wherein said housing means includes a swivel mount suspending it from above.

References Cited

UNITED STATES PATENTS

| 1,652,138 | 12/1927 | Boyden | 350—103 |
| 2,869,424 | 1/1959 | Hammer | 350—99 |
| 2,942,521 | 6/1960 | McDonald | 350—97 |

FOREIGN PATENTS

| 294,069 | 7/1928 | Great Britain | 330—106 |

PAUL R. GILLIAM, Primary Examiner

U.S. Cl. X.R.

350—106